US009477691B1

(12) United States Patent
Reiner et al.

(10) Patent No.: US 9,477,691 B1
(45) Date of Patent: Oct. 25, 2016

(54) MULTI-LATENCY DATA MANAGEMENT

(71) Applicant: EMC Corporation, Hopkinton, MA (US)

(72) Inventors: David Stephen Reiner, Lexington, MA (US); Nihar Nanda, Acton, MA (US); John Daniel Hushon, Medfield, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 543 days.

(21) Appl. No.: 13/728,387

(22) Filed: Dec. 27, 2012

(51) Int. Cl.
G06F 3/00 (2006.01)
G06F 7/00 (2006.01)
G06F 17/30 (2006.01)

(52) U.S. Cl.
CPC ..... *G06F 17/30289* (2013.01); *G06F 17/3056* (2013.01); *G06F 17/30377* (2013.01); *G06F 17/30592* (2013.01)

(58) Field of Classification Search
CPC .............. G06F 17/30289; G06F 17/30377; G06F 17/3056; G06F 17/30592
See application file for complete search history.

(56) References Cited

U.S. PATENT DOCUMENTS

| 7,756,822 | B2* | 7/2010 | Danner et al. ............ 707/602 |
| 8,170,981 | B1* | 5/2012 | Tewksbary ............... 707/600 |
| 8,751,725 | B1* | 6/2014 | Gangadharan ...... G06F 12/0638 711/100 |
| 9,043,530 | B1* | 5/2015 | Sundaram ............... G06F 3/068 711/100 |
| 2012/0246170 | A1* | 9/2012 | Iantorno ..................... 707/748 |
| 2014/0156586 | A1* | 6/2014 | Black et al. ............... 707/600 |

OTHER PUBLICATIONS

"ES2 : A Cloud Data Storage System for Supporting Both OLTP and OLAP" by Yu Cao, Chun Chen, Fei Guo, Dawei Jiang, Yuting Lin, Beng Chin Ooi, Hoang Tam Vo, Sai Wu , Quanqing Xu, 2011 IEEE.*
"A Common Database Approach for OLTP and OLAP Using an In-Memory Column Database" by Hasso Plattner, SIGMOD'09, Jun. 29-Jul. 2, 2009.*
U.S. Appl. No. 13/336,613 filed in the name of D.S. Reiner et al. on Dec. 23, 2011 and entitled "Managing Data Sets by Reasoning Over Captured Metadata."

* cited by examiner

*Primary Examiner* — Jing-Yih Shyu
(74) *Attorney, Agent, or Firm* — Ryan, Mason & Lewis, LLP

(57) ABSTRACT

A data management system comprises a multi-latency logical data store and an associated controller. The multi-latency logical data store comprises a first data store having a first data latency and a second data store having a second data latency substantially different than the first data latency. The controller is configured to manage the multi-latency logical data store utilizing multi-latency data sets each of which provides at least one multi-latency link between at least a portion of a data set from the first data store and at least a portion of a data set from the second data store. By way of example, the first data store may comprise a low-latency data store and the second data store may comprise an analytic data store having a substantially higher data latency than the low-latency data store. The data management system is implemented using one or more processing devices of a processing platform.

22 Claims, 6 Drawing Sheets

FIG. 5

| TYPE OF PROCESSING | LATENCY OF DATA CONSIDERED |
|---|---|
| ULTRA LOW LATENCY MESSAGING | < 100 MICROSECONDS |
| EXTREME TRANSACTION PROCESSING | < 1 MILLISECOND |
| STREAMING DATA ANALYSIS; NO INTERMEDIATE PERSISTENCE | < 100 MILLISECONDS |
| REAL TIME EVENT CHARACTERIZATION | < 1 SECOND |
| COMPLEX EVENT PROCESSING; NEAR REAL-TIME DASHBOARDS | < 30 SECONDS |
| OPERATIONAL DASHBOARD | < 5 MINUTES |
| INTRADAY ANALYSIS | < 2 HOURS |
| DAILY ROLLUP | ≤ 24 HOURS |
| RECENT HISTORICAL ANALYSIS | ≤ 8 DAYS |
| MEDIUM-TERM HISTORICAL ANALYSIS | ≤ 13 MONTHS |
| LONG-TERM HISTORICAL ANALYSIS | ≤ 5 YEARS |

FIG. 8

TABLE L1
PATIENT TABLE

| PATIENT ID | DATE | RECORD TIME | HEART RATE | O2 LEVEL |
|---|---|---|---|---|
| 10022 | 12/12/12 | 10:20:11 | 65 | 98 |
| 10922 | 12/12/12 | 10:20:10 | 89 | 98 |
| 10923 | 12/12/12 | 10:18:10 | 110 | 96 |
| 10922 | 12/12/12 | 10:00:19 | 75 | 96 |
| 10022 | 12/12/12 | 08:59:11 | 89 | 98 |

↓ LAG TIME (60 MINS)

TABLE A1
PATIENT TABLE

| PATIENT ID | DATE | RECORD TIME | HEART RATE | O2 LEVEL |
|---|---|---|---|---|
| 10022 | 12/12/12 | 08:59:11 | 89 | 98 |
| 10922 | 12/11/12 | 09:20:10 | 90 | 98 |
| 10923 | 11/10/12 | 08:18:10 | 127 | 96 |
| 95545 | 08/21/12 | 09:20:18 | 132 | 96 |
| 17892 | 06/11/11 | 05:10:25 | 56 | 99 |
| 11222 | 07/12/11 | 03:11:48 | 67 | 75 |
| 30122 | 11/09/10 | 22:50:17 | 98 | 88 |
| 11877 | 11/01/10 | 11:46:19 | 115 | 60 |

MULTI-LATENCY DATA MANAGEMENT

FIELD

The field relates generally to information processing systems, and more particularly to data management techniques utilized for data stores within such systems.

BACKGROUND

A wide variety of different types of data storage systems are known, including, by way of example, tiered storage systems, cloud storage systems and storage systems of virtual data centers. These and other data storage systems typically comprise one or more sets of storage devices, possibly configured in the form of storage arrays. Such data storage systems may be associated with what are generally referred to herein as "data stores" of an information processing system.

Enterprises generally want to achieve targeted performance levels from their data stores. However, this goal can be difficult to achieve in practice. For example, an enterprise may implement a single data store to store both low-latency data as well as historical data used for analytics. This type of arrangement is problematic in that the single data store cannot be optimized for both types of data.

It is also possible for an enterprise to implement two entirely separate data stores, one for low-latency data and the other for analytic data. This allows each of the data stores to be optimized for its particular type of data. However, the enterprise will generally have to provide a separate data management system for each data store. In addition, problems arise when applications running above the multiple data stores need to have data from the data stores presented to them in a consistent way. Conventional approaches such as trickle loading from the low-latency data store into the analytic data store fail to achieve consistency of the data across both data stores.

Accordingly, conventional practice is deficient in that when an enterprise uses two separate data stores for low-latency and analytic data, data management becomes increasingly complex, resulting in uneven load, query and update performance, possible gaps in data consistency, and other management difficulties.

SUMMARY

Illustrative embodiments of the present invention provide a data management system that incorporates a multi-latency logical data store. The multi-latency logical data store integrates a low-latency data store and an analytic data store in an efficient manner, and controls operations such as loading and updating across the first and second data stores in accordance with configured policies. As a result, queries against the first and second data stores will see a desired consistent view of those data stores.

In one embodiment, a data management system comprises a multi-latency logical data store and an associated controller. The controller may be implemented at least in part within the multi-latency logical data store. The multi-latency logical data store comprises a first data store having a first data latency and a second data store having a second data latency substantially different than the first data latency. The controller is configured to manage the multi-latency logical data store utilizing a plurality of multi-latency data sets each of which provides at least one multi-latency link between at least a portion of a data set from the first data store and at least a portion of a data set from the second data store.

By way of example, the first data store may comprise a low-latency data store and the second data store may comprise an analytic data store having a substantially higher data latency than the low-latency data store. In such an arrangement, the low-latency data store may be implemented at least in part utilizing SQLFire or GemFire, and the analytic data store may be implemented at least in part utilizing Greenplum.

The multi-latency data sets may comprise, for example, one or more multi-latency tables each providing at least one multi-latency link between at least a portion of a table from the first data store and at least a portion of a table from the second data store.

The data management system may be implemented using one or more processing devices of a processing platform in an information processing system.

BRIEF DESCRIPTION OF THE DRAWINGS

FIG. 5 shows examples of different data latencies associated with different types of processing that may be performed in a given implementation of the FIG. 1 information processing system.

FIG. 8 shows an exemplary view of at least a portion of a multi-latency table in one embodiment.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
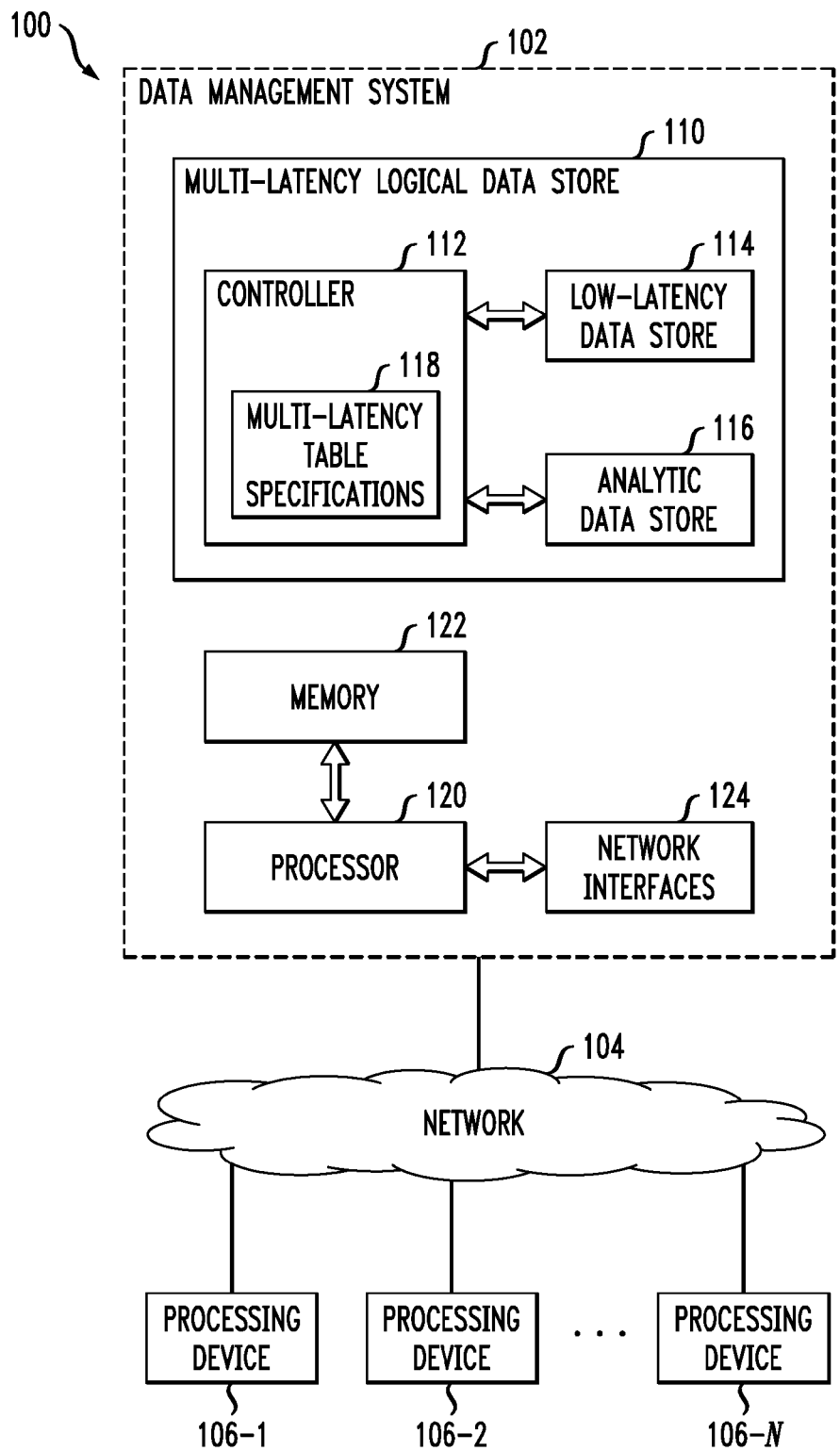
FIG. 1 is a block diagram of an information processing system comprising a multi-latency logical data store and an associated controller in an illustrative embodiment of the invention.

FIG. 1 shows an information processing system 100 configured in accordance with an illustrative embodiment of the present invention. The information processing system 100 comprises a data management system 102 that communicates over a network 104 with one or more processing devices 106-1, 106-2, . . . 106-N. The data management system 102 comprises a multi-latency logical data store 110 that includes a controller 112, a low-latency data store 114 and an analytic data store 116.

The analytic data store 116 has a substantially higher data latency than the low-latency data store 114. For example, the low-latency data store 114 may be implemented at least in part utilizing at least one of SQLFire and GemFire, both commercially available from VMware, possibly in main memory of a processing device, and the analytic data store 116 may be implemented at least in part utilizing Greenplum, commercially available from the Greenplum division of EMC Corporation. Greenplum generally has a substantially higher data latency than either SQLFire or GemFire. However, these are just examples of possible implementations, and numerous other data management products may be used to implement the data stores 114 and 116 in other embodiments. For example, possible alternatives to Greenplum for implementing the analytic data store 116 include Hadoop file system, Hive, Netezza and others, as will be readily appreciated by those skilled in the art.

The low-latency data store 114 and analytic data store 116 are therefore examples of what are more generally referred to herein as respective first and second data stores having substantially different data latencies. It should be appreciated that the disclosed techniques can be applied to a wide variety of alternative data store arrangements in which there are significant differences in data latency between two or more data stores.

It should be noted that the term "data latency" as utilized herein in the context of a given data store is intended in a general sense. Accordingly, the term is to be construed broadly, and may refer, for example, to an average latency of contents or other measure of the latency associated with particular contents of the data store.

Also, the term "data store" as used herein is intended to be broadly construed so as to encompass, for example, systems that manage data, including database management systems that have various data models (e.g., relational, network, etc.) or that may lack a data model (e.g., key-value pairs, other NoSQL databases, etc.), as well as lower-level data managers such as a Hadoop file system and associated support for MapReduce programs.

The controller 112 is configured to manage the multi-latency logical data store 110 utilizing a plurality of multi-latency data sets each of which provides at least one multi-latency link between at least a portion of a data set from the low-latency data store 114 and at least a portion of a data set from the analytic data store 116. In the present embodiment, it is assumed that at least a subset of the multi-latency data sets comprise respective multi-latency tables, with each such multi-latency table providing at least one multi-latency link between at least a portion of a table from the low-latency data store 114 and at least a portion of a table from the analytic data store 116.

A multi-latency table is therefore an example of one type of multi-latency data set, and other types of multi-latency data sets may be used in other embodiments. Additional details relating to exemplary multi-latency tables will be provided below in conjunction with FIGS. 3 and 8.

A "data set" as the term is generally used herein may be viewed as an abstraction of one or more data items, such as a table, document, file, query result, key-value pairs, index, storage block contents, in-memory caches or other data item or combinations thereof, where the given data set is characterized by properties as well as relationships to other data sets. These properties and relationships are captured by metadata that is associated with the data set in the information processing system 100.

Additional details regarding exemplary data sets and metadata characterizing those data sets, as well as techniques for reasoning over such metadata, can be found in U.S. patent application Ser. No. 13/336,613, filed Dec. 23, 2011 and entitled "Managing Data Sets by Reasoning over Captured Metadata," which is commonly assigned herewith and incorporated by reference herein.

In the present embodiment, the controller 112 stores multi-latency table specifications 118 that characterize one or more of the multi-latency tables. The controller 112 utilizes these multi-latency tables to carry out coordinated load, query and update operations across the low-latency data store 114 and the analytic data store 116. More particularly, the controller. 112 may be configured to control operations such as loading and updating across the low-latency data store 114 and the analytic data store 116 in accordance with one or more configured policies, such that queries against the low-latency data store 114 and the analytic data store 116 will see a desired consistent view of those data stores. For example, the queries in some embodiments will be provided with a particular type of consistency specified by the one or more configured policies.

Additionally or alternatively, the controller 112 can utilize a multi-latency data table to control a designated partitioning between the low-latency data store 114 and the analytic data store 116. Such a partitioning may be based at least in part on differences between the data stores relating to one or more of geography, data sources, data quality requirements, security levels, schema formats, object storage formats, query languages, query performance goals and storage algorithms, as well as other differences or combinations of differences. Thus, although illustrative embodiments utilize a temporal separation between the low-latency data store 114 and the analytic data store 116, the multi-latency logical data store 110 can support partitioning based on one or more of the above-noted differences between the data stores, in combination with or in place of the temporal separation.

The controller 112 can utilize the multi-latency tables and other multi-latency data sets to achieve designated consistency specifications between the low-latency data store 114 and the analytic data store 116. For example, a designated consistency specification may include at least one of a minimum time and a maximum time to propagate an update from the low-latency data store 114 to the analytic data store 116. It is also possible for the consistency specification to specify a particular type of update, such as a near-real-time update or a batch update. A given such update type may have associated therewith a minimum or maximum time for update propagation.

As will be described in greater detail below, these exemplary consistency specifications may provide a particular type of consistency in accordance with one or more configured policies, such as lag consistency or transform consistency, both of which will be defined below. Other types of consistency may be additionally or alternatively provided using multi-latency tables or other multi-latency data sets in the data management system 102. Such consistency types may be viewed as examples of what is more generally referred to herein as multi-latency consistency. The particular type of multi-latency consistency provided in a given embodiment may be subject to user control through policy configuration. Thus, for example, a system administrator or enterprise user may be permitted to configure one or more policies that control the provision of lag consistency, transform consistency or other type of multi-latency consistency that may be supported by the multi-latency logical data store 110.

It should be noted that other embodiments may define the operation of the multi-latency logical data store 110 using various multi-latency coherency specifications, a given one of which may generally be viewed as requiring that all writes to one of the first and second data stores of the multi-latency logical data store will eventually be seen in the other data store, and in the same order. Numerous other multi-latency coherency or multi-latency consistency definitions may be used in other embodiments.

The controller 112 may implement other types of functionality utilizing the multi-latency tables or other multi-latency data sets. For example, the controller 112 may utilize the plurality of multi-latency data sets to take a designated action in one of the data stores based on an event relating to the other data store, such as a message received from the latter data store. As another example, the controller 112 may utilize the multi-latency data sets to transform data within the low-latency data store 114, within the analytic data store 116, or in transit between those data stores. Such data transformations may include filtering the data, normalizing the data or performing other transformative operations on the data. Numerous other types of functionality may be implemented using the multi-latency data sets.

Although the controller 112 is shown in the FIG. 1 embodiment as being implemented within the multi-latency logical data store 110, in other embodiments the controller 112 may be implemented at least in part externally to the multi-latency logical data store 110. For example, it is possible to implement at least a portion of the controller 112 using other components of the data management system 102 or possibly using one or more of the processing devices 106 external to the data management system. As a more particular example, the controller 112 in some embodiments may be implemented at least in part outside of the multi-latency logical data store 110 and may serve as a state manager controlling behavior of one or more internal components of the multi-latency logical data store 110.

The data management system 102 in the present embodiment further comprises a processor 120, a memory 122 and a network interface 124. These are assumed to be elements of at least one processing device. The data management system 102 is therefore implemented in the FIG. 1 embodiment using at least one processing device comprising a processor coupled to a memory.

The processor 120 may comprise a microprocessor, a microcontroller, an application-specific integrated circuit (ASIC), a field-programmable gate array (FPGA) or other type of processing circuitry, as well as portions or combinations of such circuitry elements.

The memory 122 may comprise random access memory (RAM), read-only memory (ROM) or other types of memory, in any combination. The memory 122 and other memories disclosed herein may be viewed as examples of what are more generally referred to as "computer program products" storing executable computer program code.

The network interfaces 124 comprise network interface circuitry that allows the data management system 102 to communicate over the network 104 with the other processing devices 106 of the information processing system 100. Such network interface circuitry may comprise, for example, one or more conventional transceivers.

The network 104 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

At least a portion of the multi-latency logical data store 110 may comprise software that is stored in memory 122 and executed by processor 120.

Each of the processing devices 106 may similarly incorporate processor, memory and network interface elements of the type described above.

The data management system 102 and the processing devices 106 may comprise a common processing platform or multiple separate processing platforms. Such processing platforms can include virtual machines implemented using one or more hypervisors running on underlying physical infrastructure. Although shown as separate from the processing devices 106 in the present embodiment, the data management system 102 may be implemented at least in part using one or more such processing devices.

It should be understood that the particular sets of modules and other components implemented in the information processing system 100 as illustrated in FIG. 1 are presented by way of example only. In other embodiments, only subsets of these components, or additional or alternative sets of components, may be used, and such components may exhibit alternative functionality and configurations.

Figure 2:
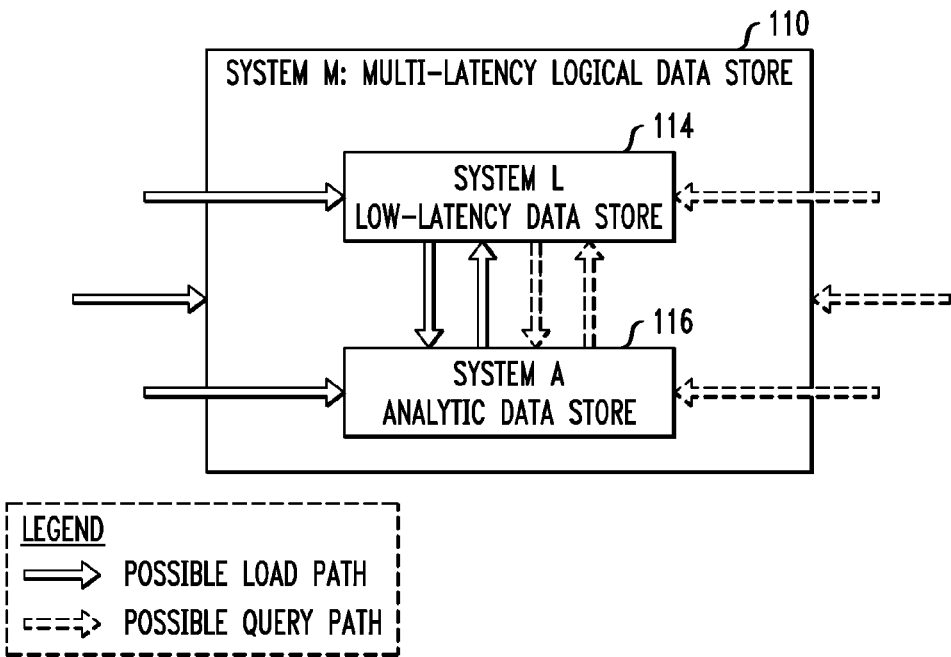
FIG. 2 illustrates possible load and query paths involving low-latency and analytic data stores integrated into the multi-latency logical data store of FIG. 1.

Referring now to FIG. 2, examples of possible load and query paths are shown involving the low-latency data store 114 and the analytic data store 116 integrated into the multi-latency logical data store 110 of the data management system 102. The multi-latency logical data store 110 in this diagram is denoted System M, and the low-latency and analytic data stores 114 and 116 are denoted System L and System A, respectively.

As is apparent from the figure, there are load and query paths into each of System L and System A, as well as load and query paths into System M. System M may be viewed as bridging System L and System A in this embodiment.

The functionality associated with System M may be implemented in a variety of different ways relative to System L and System A. For example, System M functionality may reside above System L and System A, with the advantage that System M could be used across a variety of different System L and System A instantiations. This would not rule out direct loads into System L, or queries against System L alone. Another possibility is to implement parts of System M by leveraging System L capabilities in certain areas, such as query routing, so as not to slow down low-latency processing by System L, although this would likely constrain the possible System L instantiations. Yet another possibility is to implement parts of System M by leveraging System A capabilities in certain areas, such as operation pushdown for federated queries by System A, although this would likely constrain the possible System A instantiations. Combinations of the foregoing arrangements may also be used, as required to balance generality and reusability with leverage and development time in making choices about where to place capabilities.

Although only two distinct data stores are shown in the embodiments of FIGS. 1 and 2, it is to be appreciated that a multi-latency logical data store as disclosed herein may include more than two distinct data stores, each having a different data latency. The techniques disclosed herein with reference to two data stores, such as System L and System A in FIG. 2, can be easily extended to embodiments involving more than two data stores.

Figure 3:
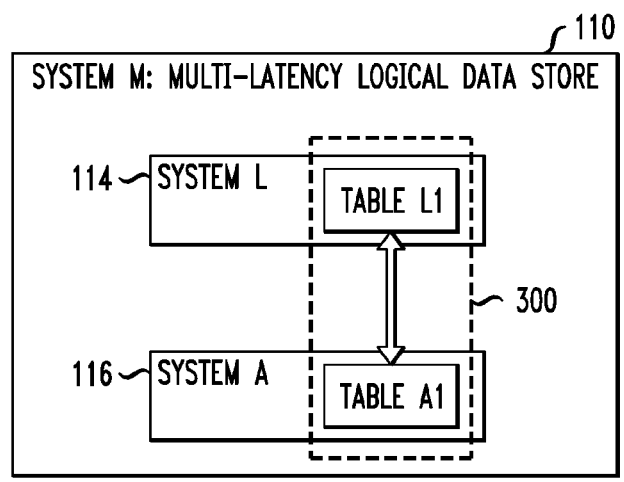
FIG. 3 illustrates a multi-latency table and a corresponding multi-latency link in the multi-latency logical data store of FIG. 1.

FIG. 3 shows an example of a multi-latency table 300 that may be utilized in System M. The multi-latency table 300 comprises first and second tables from System L and System A, respectively. The first and second tables of the multi-latency table 300 are more particularly denoted in the figure as comprising a table denoted Table L1 in System L and a table denoted Table A1 in System A, respectively. The multi-latency table 300 further comprises a multi-latency link between Table L1 and Table A1, as indicated.

Table L1 and Table A1 may comprise a matched pair of tables that are logically compatible and partition compatible with one another. In this embodiment, strict logical compatibility indicates that the table names are the same, and that attributes are matched, named the same, and are of the same type. However, other definitions of logical compatibility may be used, such as one in which the constraints on table and attribute names are relaxed as long as the semantics are substantially equivalent. Partition compatibility indicates that the tables are partitioned identically in order to facilitate data movement from System L into System A or vice versa, although again other types of partition compatibility may be defined in other embodiments. Also, other types of compatibility may exist between the two tables, such as query compatibility, which indicates that the same subquery, except for temporal predicates, may be posed against each table, thereby allowing System M to meaningfully combine subquery results.

Such an arrangement facilitates coordinated loading, querying and updating across the corresponding data stores 114 and 116 while maintaining a desired data consistency. A more detailed example of a multi-latency table comprising a pair of tables and a multi-latency link between the tables will be described below in conjunction with FIG. 8. However, it should be understood that other types of tables, or more generally data sets, may be used.

The multi-latency table 300 may be configured in accordance with a corresponding one of the multi-latency table specifications 118 of controller 112. Such a multi-latency table may comprise a logical table that hides a temporally-based rolling partition between Table L1 and Table A1.

The multi-latency logical data store 110 manages the differences in latency between System L and System A, and also controls query processing against the combination of these two systems. This may involve, for example, providing what is referred to herein as "lag consistency" across System L and System A for a given configurable time lag. Such a configurable time lag and other configuration parameters may be established through one or more configured policies. Examples of other configuration parameters include delay to load System A from System L, and data retention intervals in System L and System A.

Synchronization between System L and System A as provided by System M may be periodic or event triggered, and may involve alerts, update messages, service invocations, database log scraping, or other techniques.

System M can be configured to monitor data flow over boundaries between System L and System A, maintain logs to prove data integrity and capture transactional failures for error handling and reporting.

In the present embodiment, lag consistency may be defined with respect to the multi-latency table 300 as all writes to Table L1 eventually being seen in Table A1, and in the same order, subject to the above-noted configurable time lag. Other definitions of lag consistency may be used in other embodiments.

It should be noted that data may be transformed in transit between System L and System A using the multi-latency table 300. For example, the multi-latency table may be used to filter data from System L so that not all of it reaches System A. As another example, a state change relating to data in System L may result in a message from System L to System A that can be intercepted, evaluated and acted upon. Possible actions may include modifying or invalidating matching data in System A.

Such arrangements may be viewed as providing what is more generally referred to herein as "transform consistency." The multi-latency table 300 is said to exhibit transform consistency if any read from Table A1 will see only the correct results of transformation of data from Table L1. It should be noted that a transform-consistent multi-latency table does not necessarily exhibit lag consistency, since some data may have been filtered out or otherwise transformed as previously described. Transforms of the type described above may be implemented on data within at least one of System L and System A, and are therefore not limited in application to data in transit between the two systems.

It should also be noted that one or more tables or other data sets in System A may be derived from one or more corresponding tables or other data sets in System L. For example, a derived table may refer to a table in System A that is derived from one or more tables in System L, but for which at least one of the conditions on multi-latency tables is not met, such as logical compatibility. It is possible for such derived tables to exhibit the property of transform consistency.

Derived tables may be utilized, for example, if the data models of System L and System A differ substantially. As a more particular example, a given embodiment may require periodic data movement from GemFire into a Hadoop file system, but tables in these two data stores are not likely to exhibit logical compatibility or partition compatibility as described above. The use of derived tables can facilitate the data movement in this situation as well as numerous other situations.

One or more derived tables in System A can be produced by transforming one or more tables from System L. Similarly, one or more derived tables in System L can be produced by transforming one or more tables from System A. As one example, transactions first captured in SQLFire tables in System L may be transformed into Greenplum tables in System A for historical analysis. In the other direction, historical transactions residing in Greenplum tables in System A may be transformed into SQLFire tables in System L to provide historical context for events being captured by System L.

System M in the present embodiment provides a number of significant advantages relative to conventional arrangements. For example, System M provides flexible approaches to data ingestion and data routing, including routing across System L and System A, as well as other possible arrangements of multiple data stores having different data latencies. System M also supports a variety of event handling policies, and enables easy configuration of diverse load timings and load granularity, including real time, microbatch and batch from one data store to the other, while also allowing easy configuration of consistency between the data stores to support application needs.

In addition, System M provides strong declarative semantics across the coordinated data stores that can be interpreted through dynamic processing and assembly of information. For example, declarative semantics can be used to specify enforcement of lag consistency, transform consistency or other types of multi-latency consistency.

Moreover, System M supports a variety of different querying strategies and also handles related functionality such as sorting, result deduplication and updating. This allows applications to query a single virtual data store that includes both System L and System A, and possibly additional or alternative data stores having different data latencies. Such an approach greatly eases the burden on application developers, who do not have to write complex query, sort, result deduplication and update logic in their applications. While queries may still be executed against System L or System A (e.g., to query older data), they may also be executed transparently against the combination of low-latency and historical data, with System M providing transforming, routing and orchestrating subqueries as needed. System M can also generate near-real-time views against multi-latency data stores and provide to these applications as a data service.

At the analytic and business intelligence level, System M can support complex event processing across the multi-latency data stores. It can facilitate analysis of recent events with a historical context, and also facilitate deep exploration of history with visibility into recent trends. Moreover, System M can permit data scientist models that are first developed against historical data to run on low-latency data (referred to herein as "analytic turbocharging").

The multi-latency tables provided by System M can close the gap between transactional and analytical query processing, providing a data view continuum across temporal boundaries. Both analytic and transactional applications can read and write to a virtual table storing data spanning a long timeframe with excellent database performance.

As compared to separate management of System L and System A, System M can provide common approaches to loading, synchronization, federation and application development, as well as performance, standardization, interoperability, backup and recovery, security, multi-tenancy, compliance, licensing, deployment, management and maintainability.

The operation of the system 100 will now be described in greater detail with reference to the flow diagram of FIG. 4, which illustrates an exemplary process performed by the data management system 102 in one embodiment. The process as shown includes steps 400 through 406.

In step 400, a multi-latency logical data store such as multi-latency logical data store 110 is configured to include a first data store having a first data latency and a second data store having a second data latency substantially different than the first data latency. As indicated previously, the first and second data stores in the content of FIG. 1 comprise the low-latency data store 114 and the analytic data store 116, respectively.

In step 402, specifications are determined for a plurality of multi-latency tables each of which provides at least one multi-latency link between at least a portion of a table from the first data store and at least a portion of a table from the second data store. These specifications comprise at least a subset of the multi-latency table specifications 118 utilized by the controller 112 in the FIG. 1 embodiment. The specifications can be determined by the controller 112 or may be retrieved from memory 122 or obtained from another system component such as one of the processing devices 106.

In step 404, the plurality of multi-latency tables are utilized to control loading and updating across the first and second data stores in accordance with configured policies such that queries against the first and second data stores will see a desired consistent view of those data stores. For example, multi-latency tables such as multi-latency table 300 described in conjunction with FIG. 3 may be utilized to provide one or more of lag consistency and transform consistency across the data stores as previously described.

In step 406, queries against the first data store, the second data store or both data stores are planned and executed.

Figure 4:
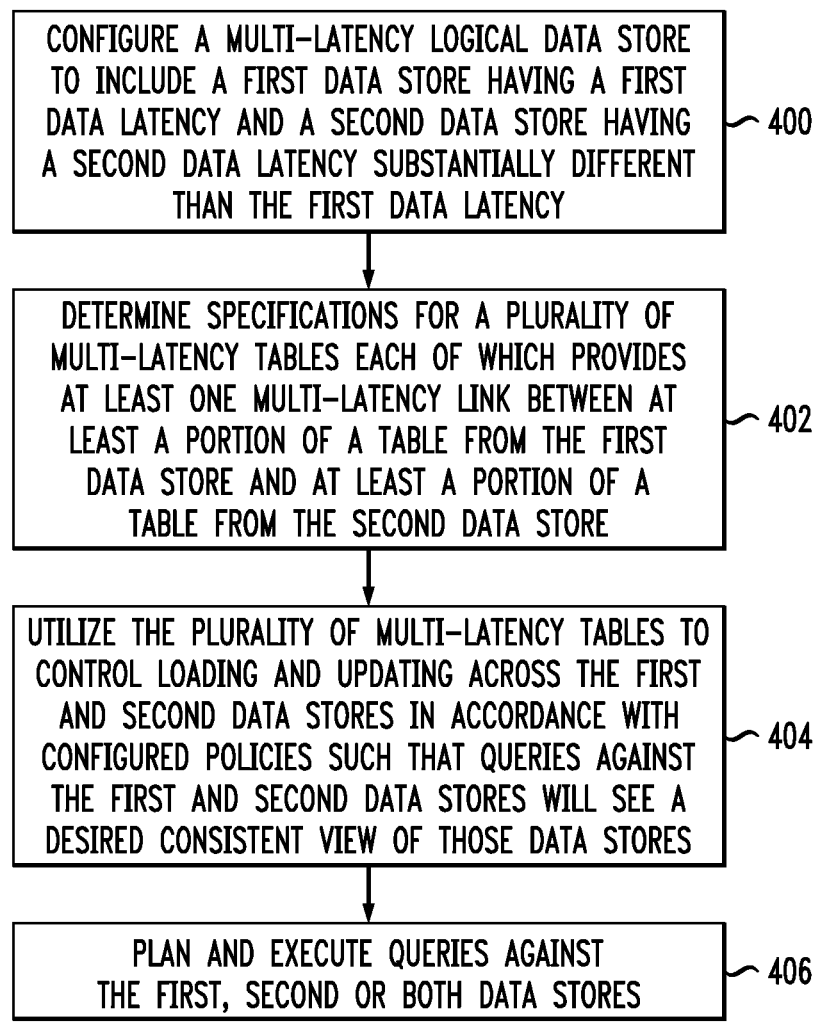
FIG. 4 is a flow diagram of a multi-latency data management process implemented utilizing the multi-latency logical data store of FIG. 1.

The particular processing operations and other system functionality described in conjunction with the flow diagram of FIG. 4 are presented by way of illustrative example only, and should not be construed as limiting the scope of the invention in any way. Alternative embodiments can use other types of processing operations for implementing a multi-latency logical data store in system 100. For example, the ordering of the process steps may be varied in other embodiments, or certain steps may be performed concurrently with one another rather than serially.

It is to be appreciated that functionality such as that described in conjunction with the flow diagram of FIG. 4 can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

It should be noted that references herein to the data latencies associated with the respective low-latency and analytic data stores 114 and 116 are considered relative terms. FIG. 5 shows examples of different approximate data latencies associated with different types of processing that may be performed in a given implementation of the information processing system 100 of FIG. 1. These range from ultra-low latency messaging having an approximate latency of less than 100 microseconds to various types of recent, medium-term and long-term historical analysis having approximate latencies on the order of days or years. Although not shown in FIG. 5, lower bounds may be specified on the approximate latency for each of the different types of processing. For example, operational dashboards might cover data whose latency is in the range of about 30 seconds to 5 minutes. Such time ranges may be specified for each of the processing categories in FIG. 5.

As mentioned above, the multi-latency logical data store 110 may be configured to manage multiple data stores that have substantially different data latencies. Thus, instead of a single low-latency data store and a single analytic data store as in the FIG. 1 embodiment, other embodiments may comprise more than two data stores each being associated with a different portion of a latency spectrum such that shown in FIG. 5.

Figure 6:
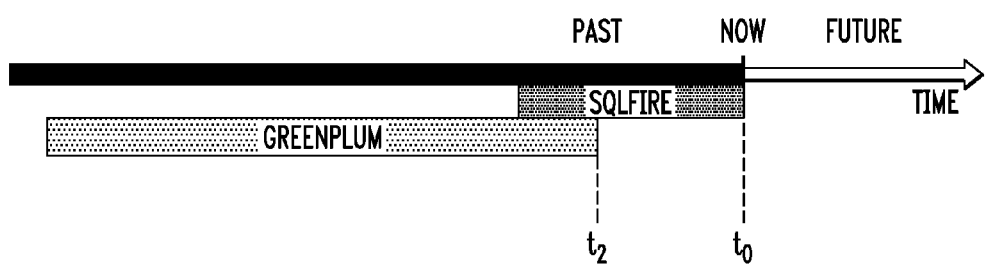
FIGS. 6 and 7 are timing diagrams illustrating data latency and data movement coordinated by a multi-latency logical data store in one embodiment.
Figure 7:
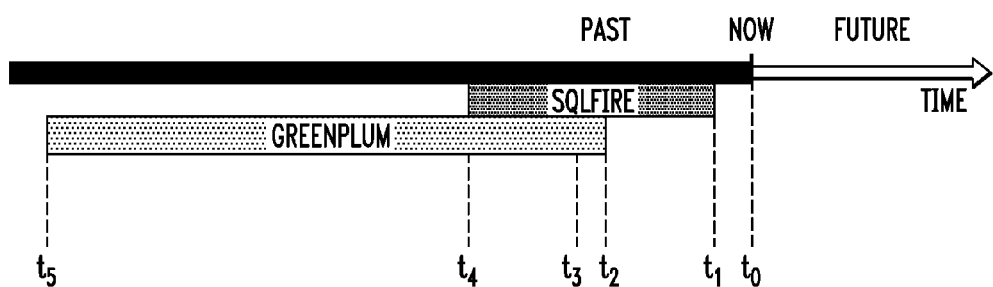

Referring now to FIGS. 6 and 7, timing diagrams are shown that illustrate data latency and data movement coordinated by a multi-latency logical data store in one embodiment. In this embodiment, it is assumed that the multi-latency logical data store comprises a low-latency data store or System L that is implemented using SQLFire, and an analytic data store or System A that is implemented using Greenplum. Time advances from left to right in the timing diagrams as System L and System A capture low-latency and historical data, respectively. The time $t_0$ denotes a current time.

FIG. 6 generally indicates that there is a delay of $t_2-t_0$ between the loading or updating of SQLFire at $t_0$ and the loading or updating of Greenplum at time $t_2$. However, this oversimplifies the situation, making it seem as if loads or updates are instantaneous.

FIG. 7 shows a more detailed view of the timing of relative operations of SQLFire and Greenplum in System L and System A, respectively, and illustrates the following:

1. Real time delay to load SQLFire=$t_1-t_0$

2. Minimum real time delay to load or update Greenplum from SQLFire=$t_2-t_0$

3. Maximum real time delay to load or update Greenplum from SQLFire=$t_3-t_0$

4. If continuously loading from SQLFire to Greenplum, then $t_2-t_1$ is near 0

5. If loading into Greenplum is quick or continuous, then $t_3-t_2$ is small

6. Lag consistency of Greenplum with respect to SQLFire=$t_3-t_1$

7. Lag consistency of Greenplum with respect to events=$t_3-t_0$

8. Retention interval for SQLFire=$t_4-t_0$

9. Retention interval for Greenplum=$t_5-t_0$

The multi-latency logic data store may configure parameters such as $t_2$, $t_4$ and $t_5$ and possibly also $t_1$ and $t_3$. It should be noted in this regard that $t_4$ may be equal to $t_3$ in some embodiments.

A number of examples of use cases will now be described that illustrate particular implementations of data management system 102 and its multi-latency logical data store 110 in a variety of different fields.

A first use case relates to recording of patient vital signs in a medical application. Assume that patients in an emergency room or other medical facility are connected to sensor devices that monitor heart rate and blood oxygen levels. The corresponding sensor data is collected rapidly in a low-latency table implemented using SQLFire. Data in the low-latency table is accessed to detect any abnormalities in a near-real-time manner such that appropriate alerts can be provided to attending medical staff. The sensor data is also migrated from the low-latency table to an analytical table implemented using Greenplum. The migration may be performed periodically in order to make space in the low-latency table. Data in the analytic table is used to run deep historical analytics to determine long-term trends for the patients for purposes such as identifying effectiveness of treatments. Maintenance and administration of the information as a single multi-latency logical data store not only helps simplify application logic by removing difficult and excessive data management code but also enables administrators to virtualize views of the data over a latency spectrum.

FIG. 8 shows an exemplary multi-latency table for the medical patient vital signs use case described above. The multi-latency table in this example is of the same general form as the multi-latency table 300 previously described in conjunction with FIG. 3. More particularly, in this example, the multi-latency table comprises Table L1 that incorporates a patient table including columns for Patient ID, Date, Record Time, Heart Rate and O2 Level. The multi-latency table further comprises Table A1 that incorporates a patient table configured in the same manner as the patient table of Table L1. A multi-latency link between Table L1 and Table A1 specifies a lag time of 60 minutes between the two tables.

In another use case, a manufacturing company keeps track of the process of building custom components as required by its customer. The manufacturing company uses RFID technology to keep track of the process as the components are assembled and reports progress to an operational analytics system for real-time decision making. The low-latency data emitted from the RFID sensors is collected throughout the process in a low-latency table implemented using SQLFire. The low-latency table is at intervals backed up by an analytic table implemented using Greenplum. A reporting application issues status queries to a multi-latency logical data store comprising a multi-latency table that combines the low-latency and analytic tables. The multi-latency logical data store splits the queries, collects data from both the low-latency table and the analytic table, and combines the results for delivery back to the reporting application. The use of a single multi-latency logical data store gives a unified view to the reporting application, while hiding the details of consistency and integrity management. This approach again simplifies the application logic.

The following are additional examples of use cases that may be implemented using the data management system 102 and its multi-latency logical data store 110. Although these and other use cases disclosed herein generally relate to applications in specific fields, it is to be appreciated that the data management system 102 can be adapted for use in numerous other applications in a wide variety of other fields.

1. Financial instrument trading: Integrate continuous query of an in-memory data store of very recent capital market transactions with contextual queries against a historic, analytic data store of historical market activity.

2. Anti-terrorism: Infer plans, threats, individuals of interest, and terrorist cells by matching and contrasting near-real-time events with historical records of contacts, communications, and activities.

3. Energy distribution: Control power distribution grid by monitoring usage loads, detecting component failures, and understanding historical usage patterns.

4. Agricultural crop analysis: Determine yields and problem areas through analysis of near-real-time data (e.g., GPS location data and activity of farm machinery such as a combine) in conjunction with historical data on seed varieties, planting methods, fertilization and pesticides.

5. Weather forecasting: Forecast weather and its impact from real time and historical sensor data, prior predictions and outcomes, satellite photos and videos plus YouTube videos, online posts and photos.

6. Health care fraud detection: Combine real time and historical data to identify potential fraudulent office visits and procedures during the pre-approval process, avoiding significant health system costs.

Again, these use cases are examples only, and the data management system 102 can be adapted for numerous other use cases. It is readily apparent from the use cases disclosed herein that embodiments of the present invention can provide a number of significant advantages relative to conventional practice.

As indicated previously, functionality associated with a multi-latency logical data store as disclosed herein can be implemented at least in part in the form of one or more software programs stored in memory and executed by a processor of a processing device such as a computer or a virtual machine.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, data management systems and associated data stores. Numerous other embodiments within the scope of the appended claims will be readily apparent to those skilled in the art.

What is claimed is:

1. A data management system comprising:
a multi-latency logical data store comprising a first data store having a first data latency and a second data store having a second data latency substantially different than the first data latency; and a controller associated with the multi-latency logical data store;

wherein the controller is configured to manage the multi-latency logical data store utilizing a plurality of multi-latency data sets each of which provides at least one multi-latency link between at least a portion of a data set from the first data store and at least a portion of a data set from the second data store;

wherein one or more of the plurality of multi-latency data sets each comprises a multi-latency table providing at least one multi-latency link between at least a portion of a table from the first data store and at least a portion of a table from the second data store; and wherein the data management system is implemented using at least one processing device comprising a processor coupled to a memory.

2. The data management system of claim 1 wherein the controller is implemented at least in part outside of the multi-latency logical data store and serves as a state manager controlling behavior of one or more components of the multi-latency logical data store.

3. The data management system of claim 1 wherein the first data store comprises a low-latency data store and the second data store comprises an analytic data store having a substantially higher data latency than the low-latency data store.

4. The data management system of claim 3 wherein the low-latency data store is implemented at least in part utilizing at least one of SQLFire and GemFire.

5. The data management system of claim 3 wherein the analytic data store is implemented at least in part utilizing Greenplum.

6. The data management system of claim 1 wherein the data sets from the first and second data stores comprise a matched pair of tables that are logically compatible and partition compatible with one another.

7. The data management system of claim 1 wherein at least one data set in the second data store is derived from one or more data sets in the first data store.

8. The data management system of claim 1 wherein the controller is configured to utilize the plurality of multi-latency data sets to transform data in at least one of within the first data store, within the second data store and in transit between the first and second data stores.

9. The data management system of claim 8 wherein transforming data in at least one of within the first data store, within the second data store and in transit between the first and second data stores comprises one or more of filtering the data and normalizing the data.

10. The data management system of claim 1 wherein the controller is configured to utilize the plurality of multi-latency data sets to take a designated action in the second data store based on an event relating to the first data store.

11. A data management system comprising:
a multi-latency logical data store comprising a first data store having a first data latency and a second data store having a second data latency substantially different than the first data latency; and
a controller associated with the multi-latency logical data store;
wherein the controller is configured to manage the multi-latency logical data store utilizing a plurality of multi-latency data sets each of which provides at least one multi-latency link between at least a portion of a data set from the first data store and at least a portion of a data set from the second data store;
wherein the controller is configured to utilize the plurality of multi-latency data sets to carry out coordinated load, query and update operations across the first and second data stores; and
wherein the data management system is implemented using at least one processing device comprising a processor coupled to a memory.

12. The data management system of claim 11 wherein one or more of the plurality of multi-latency data sets each comprises a multi-latency table providing at least one multi-latency link between at least a portion of a table from the first data store and at least a portion of a table from the second data store.

13. A data management system comprising:
a multi-latency logical data store comprising a first data store having a first data latency and a second data store having a second data latency substantially different than the first data latency; and
a controller associated with the multi-latency logical data store;
wherein the controller is configured to manage the multi-latency logical data store utilizing a plurality of multi-latency data sets each of which provides at least one multi-latency link between at least a portion of a data set from the first data store and at least a portion of a data set from the second data store;
wherein the controller is configured to utilize the plurality of multi-latency data sets to control a designated partitioning between the first and second data stores; and
wherein the data management system is implemented using at least one processing device comprising a processor coupled to a memory.

14. The data management system of claim 13 wherein the designated partitioning is based at least in part on differences between the first and second data stores relating to one or more of lag time, geography, data sources, data quality requirements, security levels, schema formats, object storage formats, query languages, query performance goals and storage algorithms.

15. A data management system comprising:
a multi-latency logical data store comprising a first data store having a first data latency and a second data store having a second data latency substantially different than the first data latency; and
a controller associated with the multi-latency logical data store;
wherein the controller is configured to manage the multi-latency logical data store utilizing a plurality of multi-latency data sets each of which provides at least one multi-latency link between at least a portion of a data set from the first data store and at least a portion of a data set from the second data store;
wherein the controller is configured to utilize the plurality of multi-latency data sets to achieve designated consistency specifications between the first and second data stores; and
wherein the data management system is implemented using at least one processing device comprising a processor coupled to a memory.

16. The data management system of claim 15 wherein the designated consistency specifications include one or more of lag consistency and transform consistency.

17. The data management system of claim 15 wherein the designated consistency specifications include at least one of a minimum time to propagate an update from the first data store to the second data store, a maximum time to propagate an update from the first data store to the second data store, and an update type identifying a particular type of update including at least one of a near-real-time update and a batch update.

18. A method comprising:
configuring a multi-latency logical data store comprising a first data store having a first data latency and a second data store having a second data latency substantially different than the first data latency; and
managing the multi-latency logical data store utilizing a plurality of multi-latency data sets each of which provides at least one multi-latency link between at least a portion of a data set from the first data store and at least a portion of a data set from the second data store;
wherein one or more of the plurality of multi-latency data sets each comprises a multi-latency table providing at least one multi-latency link between at least a portion of a table from the first data store and at least a portion of a table from the second data store; and
wherein the configuring and managing are performed by at least one processing device comprising a processor coupled to a memory.

19. The method of claim 18 wherein managing the multi-latency logical data store utilizing the plurality of multi-latency data sets comprises utilizing the plurality of multi-latency data sets to carry out coordinated load, query and update operations across the first and second data stores.

20. The method of claim 18 wherein managing the multi-latency logical data store utilizing the plurality of multi-latency tables comprises utilizing the plurality of multi-latency tables to control a designated partitioning between the first and second data stores.

21. The method of claim 18 wherein managing the multi-latency logical data store utilizing the plurality of multi-latency data sets comprises utilizing the plurality of multi-latency data sets to achieve designated consistency specifications between the first and second data stores.

22. A computer program product comprising a non-transitory processor-readable storage medium having encoded therein executable code of one or more software programs, wherein the one or more software programs when executed by at least one processor of at least one processing device cause said at least one processing device:
to configure a multi-latency logical data store comprising a first data store having a first data latency and a second data store having a second data latency substantially different than the first data latency; and
to manage the multi-latency logical data store utilizing a plurality of multi-latency data sets each of which provides at least one multi-latency link between at least a portion of a data set from the first data store and at least a portion of a data set from the second data store;
wherein one or more of the plurality of multi-latency data sets each comprises a multi-latency table providing at least one multi-latency link between at least a portion of a table from the first data store and at least a portion of a table from the second data store.

\* \* \* \* \*